US00RE40393E

(19) United States
(12) Reissued Patent
Hess et al.

(10) Patent Number: US RE40,393 E
(45) Date of Reissued Patent: Jun. 24, 2008

(54) METHOD AND APPARATUS FOR CONTROLLED ICE CRYSTAL FORMATION IN A BEVERAGE

(75) Inventors: Markus Hess, Thornhill (CA); Cameron Dougall, Orillia (CA); Sam Chiusolo, Port Perry (CA)

(73) Assignee: Icefloe Technologies Inc. (CA)

(21) Appl. No.: 11/593,192

(22) Filed: Nov. 3, 2006

Related U.S. Patent Documents

Reissue of:
(64) Patent No.: 6,928,824
Issued: Aug. 16, 2005
Appl. No.: 10/751,855
Filed: Jan. 6, 2004

(30) Foreign Application Priority Data

Nov. 12, 2003 (CA) ..... 2448893

(51) Int. Cl.
*B60H 5/62* (2006.01)

(52) U.S. Cl. ..... 62/66; 62/340; 62/389; 222/146.6

(58) Field of Classification Search ..... 62/66–74, 62/337–339, 340–356, 389–400, 430–439; 222/146.6; 137/613
See application file for complete search history.

(56) References Cited

U.S. PATENT DOCUMENTS 1,951,412 A * 3/1934 Hill ..... 62/69
1,962,580 A * 6/1934 Carpenter ..... 62/534
2,485,610 A * 10/1949 Kromer ..... 62/259.1
2,502,610 A * 4/1950 Wegman ..... 62/339
2,506,840 A * 5/1950 Pique ..... 62/339
3,456,452 A * 7/1969 Gunter ..... 62/59
3,788,090 A 1/1974 Richards
5,383,342 A 1/1995 El-Boher et al.
5,869,114 A 2/1999 Murray et al.
6,141,969 A 11/2000 Launchbury et al.
6,250,084 B1 * 6/2001 Sato et al. ..... 62/3.64
6,367,285 B1 4/2002 Shinozaki et al.
6,631,823 B2 10/2003 Stillinger et al.

FOREIGN PATENT DOCUMENTS

| | | | |
|---|---|---|---|
| CA | 2391876 | * | 5/2001 |
| EP | 1 078 038 | | 11/2002 |
| EP | 1 078 039 B1 | * | 7/2003 |
| GB | 1420791 | * | 1/1976 |
| WO | WO 99/600092 | * | 11/1999 |

* cited by examiner

*Primary Examiner*—William E Tapolcai
(74) *Attorney, Agent, or Firm*—Harness, Dickey & Pierce, P.L.C.

(57) ABSTRACT

A method for producing a desired amount of ice crystal formation in a beverage comprising the steps of cooling said beverage to a temperature below its ordinary freezing temperature at atmospheric pressure to form a cooled beverage; maintaining said beverage at a pressure sufficient to inhibit freezing of said beverage; dispensing said cooled beverage into a vessel; obtaining a cooled surface, having a temperature sufficiently low to cause flash freezing of a portion of said cooled beverage which comes into contact therewith; and presenting said cooled surface to said beverage for a time sufficient to form a desired amount of said ice crystals in said beverage. An apparatus is provided for carrying out the method.

25 Claims, 2 Drawing Sheets

METHOD AND APPARATUS FOR CONTROLLED ICE CRYSTAL FORMATION IN A BEVERAGE

Matter enclosed in heavy brackets [ ] appears in the original patent but forms no part of this reissue specification; matter printed in italics indicates the additions made by reissue.

FIELD OF THE INVENTION

This invention relates generally to methods and apparatus for cooling and dispensing beverages. More particularly, this invention relates to such a method and apparatus for practicing the method to produce ice crystals in a beverage as part of the dispensing of the beverage.

BACKGROUND OF THE INVENTION

There is nothing quite like a glass of cold beer on a hot day, yet all glasses of cold beer are not equal. They range from a slightly cool beer in a disposable plastic cup through a truly cold beer in a glass dripping with condensation to a frosty mug hazed with ice and frozen water droplets. While the latter presentation may not be optimal from a taster's perspective, it captures a certain suggestion of "cooling-off" which is absent in a slightly cool pub draught.

In venues where coldness is paramount to taste, such as for example a golf course on a scorchingly hot day or basking in the hot sun at an oceanside resort the ultimate expression of "cold and refreshing" is to achieve ice crystals in the beverage. While this may be achieved in juices and such by adding ice to a cold beverage, it is generally unacceptable with beer as the ice will dilute and spoil the taste of the beer as the ice melts. The alternative is to form ice crystals from water inherent in the beverage, be it beer, "soda pop" or perhaps wine or other spirit containing beverage.

While it is simple enough in theory to form ice crystals in a beverage, it has in practice heretofore been virtually impossible to do so with any degree of control over the quantity and the consistency of ice crystals so formed. Simply cooling beer to below its freezing point generally results in a block of "ice" if the container is left closed or frozen "slush" if the container is opened before the beer turns to "ice".

It is therefore an object of the present invention to provide a method and an apparatus for practising the method for providing a controllable amount of ice crystal formation in at least beer and perhaps other beverages.

SUMMARY OF THE INVENTION

A method is provided for producing a desired amount of ice crystal formation in a beverage comprising the steps of:

(i) cooling the beverage to a temperature near or below its ordinary freezing temperature at atmospheric pressure to form a cold beverage;

(ii) maintaining the beverage at a pressure sufficient to inhibit freezing of the beverage;

(iii) dispensing the cooled beverage into a vessel;

(iv) obtaining a cooled surface having a temperature sufficiently low to cause flash freezing of a portion of the cooled beverage which comes into contact therewith;

(v) presenting the cooled surface to the beverage during the dispensing for a time sufficient to form a desired amount of ice crystals in the beverage.

Once a desired amount of ice crystal formation has been achieved, the cooled surface may be at least one of, removed from contact with the beverage and allowed to warm to a temperature above which further ice crystals won't form.

The beverage may be beer cooled to temperature of from 23.0° F. to 28.0° F. and the pressure from 15 psi to 110 psi or higher.

The beverage may be dispensed through a dispensing tap with the pressure being reduced immediately upstream of the dispensing tap during dispensing to avoid splashing.

Preferably, if the beverage is beer with a 5% by volume alcohol content, the temperature in step (i) is from 24.0° F. to 27.0° F. and the elevated pressure is at least 60 psi.

A beverage dispensing apparatus is provided for chilling and presenting a vessel of the beverage with a portion of the beverage being in the form of ice crystals. The apparatus has a beverage inlet for receiving the beverage from a reservoir of the beverage. The apparatus further has a valved tap for dispensing the beverage into the vessel. A beverage conduit extends between the tap and the beverage inlet for providing fluid communication between the tap and the beverage inlet. A beverage pressurizer communicates with the conduit for increasing the pressure of the beverage to an elevated pressure sufficient to avoid freezing. A beverage cooler is associated with the beverage conduit for chilling at least the beverage within the conduit to a temperature below its freezing point at atmospheric pressure but above its freezing point at the elevated pressure. A pressure reducer is provided adjacent the tap for reducing the pressure of the beverage from its elevated pressure in the conduit to a pouring pressure to facilitate pouring from the tap when the tap is in an open configuration. The apparatus further has a flash freezer with a freezing surface for contacting the beverage during a pour of the beverage into the vessel to freeze a portion of the beverage to form ice crystals during the pour. A flash freezer cooler is associated with the flash freezer for chilling the flash freezing surface to a temperature sufficiently low to form the ice crystals upon contact.

The beverage cooler may include a length of the conduit and a coolant bath surrounding the length of the conduit for receiving a chilled coolant to immerse the length of conduit. A beverage coolant refrigeration unit may be provided which communicates with the coolant in the bath for chilling the coolant.

The flash freezer cooler may include a flash freezer refrigeration unit for communicating with the freezing surface for cooling the freezing surface.

The beverage coolant refrigeration unit and a flash freezer refrigeration unit may be discrete units.

The length of the conduit immersed in the coolant bath may be in the form of a coil.

The pressure reducer may be a flow restrictor upstream of the tap.

The apparatus may further include a heater for heating the coolant in the bath should the coolant fall below a predetermined temperature and a sensor for sensing at least one of coolant temperature and beer temperature. The sensor and the heater communicate with a controller which activates and deactivates the heater and respectively deactivates and activates a pump which provides coolant flow between the coolant bath and the beverage refrigeration unit.

The controller may further communicate with and be configured to deactivate and activate the beverage refrigeration unit.

The flash freezer may be a cold probe which is passed through the beverage during pouring.

Alternatively the flash freezer may be a surface in the vessel and the flash freezer cooler a cold surface in contact with the vessel at least before the pour.

The flash freezer may be associated with or within the tap.

The flow restrictor may be at least one of a valve, an orifice and a reduced diameter length of the conduit.

A beverage vessel is provided for promoting ice formation of a cold beverage as it is dispensed into the vessel. The vessel has a base, a sidewall portion extending from the base and defining a mouth of the vessel opposite the base. A heat sink extends through and sealingly engages the base. The heat sink has an outer surface adjacent an outer face of the base for contacting a cooling surface and an inner surface opposite the outer surface adjacent an inner face of the base for contacting the beverage to draw heat form the beverage. The heat sink has a higher thermal conductivity than a remainder of the vessel.

The base and the walls of the vessel may be made of glass or plastic with the heat sink being made of metal.

The heat sink may preferably be an aluminum or copper based alloy.

A coolant jacket may be provided around the conduit adjacent the tap for circulation of the coolant about the conduit between the bath and the tap.

The coolant jacket may have an inlet fluidly communicating with the coolant bath through a cooling jacket pump connected between the coolant bath and the coolant jacket. An outlet of the coolant jacket may fluidly communicate directly with the coolant bath to act as a fluid return from the coolant jacket to the coolant bath.

DESCRIPTION OF DRAWINGS

Preferred embodiments of the invention are described below with reference to the accompanying drawings in which.

DESCRIPTION OF PREFERRED EMBODIMENTS

Figure 1:
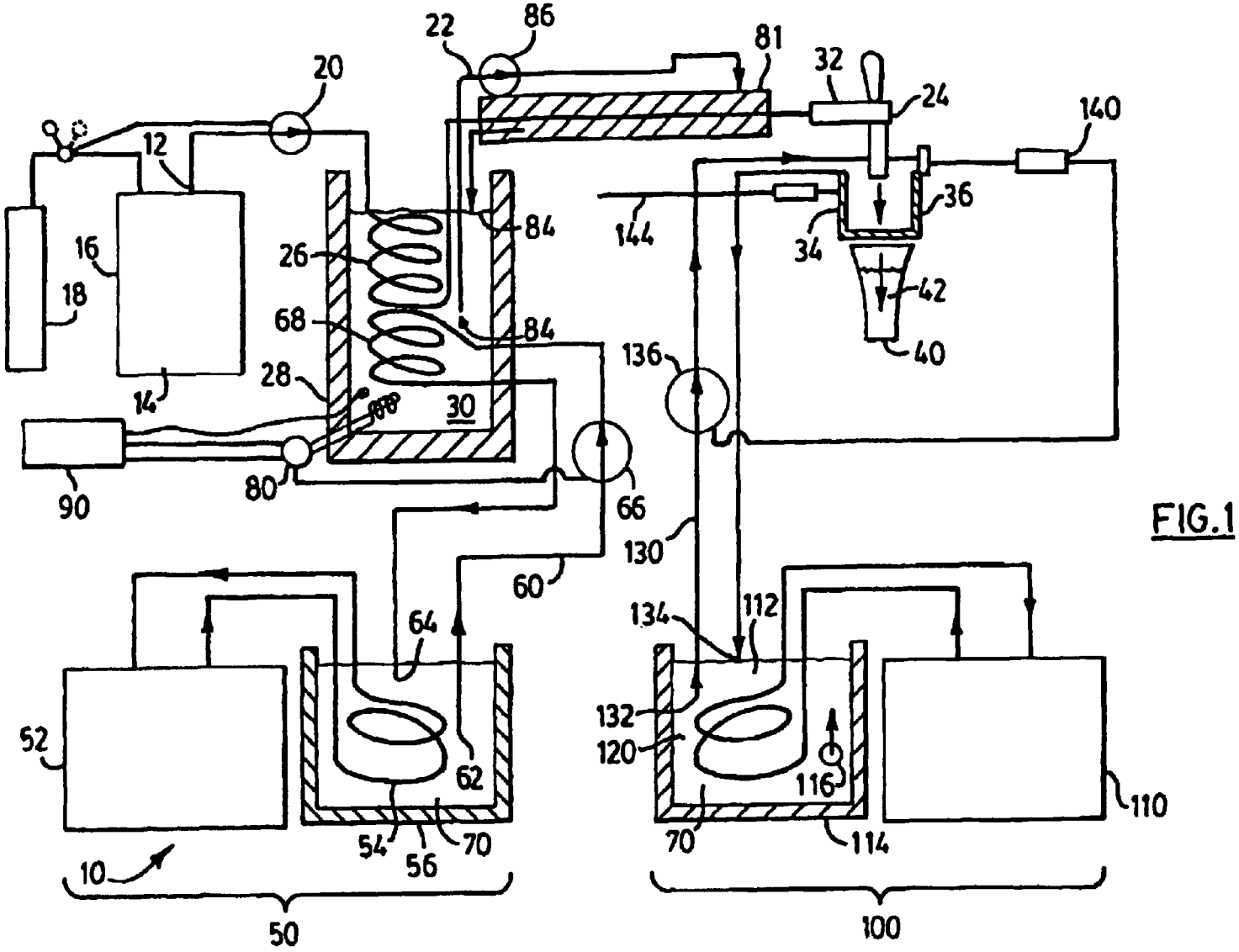
FIG. 1 is a schematic representation of an apparatus according to the present invention; and, FIG. 2 is an axial sectional view of a beverage glass for use in practice and embodiment of the present invention.

A beverage dispensing apparatus (the "apparatus") according to the present invention is generally indicated by reference 10 in the accompanying illustration. The apparatus 10 has a beverage inlet 12 for receiving a beverage 14 such as beer from a beverage reservoir 16 which may be a beer keg. A gas canister 18 may be provided to urge the beverage 14 from the reservoir to a beverage pressurizer such as the pump 20. As will be described in more detail below, the pump increases the pressure of the beverage 14 (beer) in the apparatus 10 to depress its freezing point.

The pump 20 pumps the beer through a beverage conduit 22 at the opposite end of which is a valved tap 24. The beverage conduit 22 has part of its length formed into a coil 26 which is immersed in a coolant bath containing a coolant 30, such as glycol or any other suitable coolant, for cooling the coil 26 and in turn any beer (or other beverage 14) therein to a temperature below which it would freeze under atmospheric pressure (i.e. 1 atm) but above its freezing point at the elevated pressure caused by the pump 20.

As the beverage 14 has a tendency to splash out of a vessel if disposed at high pressure, a pressure reducer 32 is provided adjacent the tap 24. The pressure reducer may be any one or a combination of a flow restricting orifice, a valve and a reduced diameter section of the beverage conduit 22.

A flash freezer 34 such as the probe illustrated is provided adjacent the tap 24 for contacting the beverage during at least a portion of its pour. The flash freezer 34 has a freezing surface 36 which contacts the beverage as it is being poured into a vessel 40 filled to freeze and thereby to form ice from an aqueous portion of the beverage 14. The temperature, heat transfer capabilities and contact duration selected will determine the nature and quantity of ice crystals.

A beverage cooler generally indicated by reference 50 and described in more detail below is provided for chilling the coolant 30. A flash freezer cooler generally indicated by reference 100 and also described in more detail below is provided for chilling at least the freezing surface 36 to a temperature sufficiently low to cause ice crystal formation upon contact of the beverage 14 therewith.

The beverage cooler 50 includes a beverage coolant refrigeration unit 52("b/c refrigeration unit 52") which may be a commercially available refrigeration system having evaporator coil 54 which is immersed in a beverage cooler glycol tank 56 ("b/c glycol tank 56"). The refrigeration unit 52 thermally communicates with the coolant bath 28 via a beverage coolant glycol line 60 ("b/c glycol line 60") having an inlet 62 for admitting glycol 70 (or other suitable coolant) from the b/c glycol tank 56 and an outlet 64 for returning glycol 70 to the b/c glycol tank 56. The b/c glycol line 60 includes a heat transfer coil 68 which is immersed in the coolant 30 in the coolant bath 28 to cool the coolant bath 28. A pump 66 is provided in the b/c glycol line 60 to cause flow of glycol 70 from the b/c glycol tank 56 through the heat transfer coil 68 and back into the b/c glycol tank 56.

The object of using the b/c glycol line 60 and b/c glycol tank 56 rather than directly trying to cool the coolant bath 28 with the b/c refrigeration unit 52 is to achieve better temperature control. Maintaining a supply of cold (approximately 15° F./−9° C.) of glycol 70 in the b/c glycol tank 56 and using a relatively high capacity pump 66 (about 2 gpm) allows better response to the intermittent thermal demands such as a pour than can be simply achieved with the b/c refrigeration unit 52 were it acting directly on the coolant 30 within the coolant bath 28.

For even better control the coolant bath 28 can be set up as a "push pull" system by the addition of a heater 80 immersed in the coolant 30 in the coolant bath 28. The heater 80 may be activated and the glycol pump 66 shut off if the temperature of the coolant 30 drops to or below a temperature set point. A controller 90 may be provided in communication with a temperature sensor 92 in the coolant bath, the heater 80 and the pump 66 to actuate and deactuate the heater 80 and the pump 66 as required.

A cooling jacket 80 may be provided around the beverage conduit 22 adjacent the tap 24 to maintain the portion of the conduit 22 between the coil 26 and the tap 24 cold between pours. The cooling jacket 80 may have an inlet 82 for receiving cooling 30 from the coolant bath 28, an outlet 84 for returning coolant to the coolant bath 28 and a pump 86 for augmenting coolant flow.

The flash freezer cooler 100 is preferably provided with its own refrigeration unit 110 (the "ffc refrigeration unit 110") as it generally requires lower temperatures than required for the beverage cooler 50.

The ffc refrigeration unit 110 may be a commercially available unit having an evaporator coil 112 immersed in a flash freezer glycol tank 114 ("ff glycol tank 114") with its own supply of glycol 120 (or other suitable coolant) typically cooled to a temperature of around −10° F. (−26° C.). A small pump 116 or other stirrer may be provided in the ff glycol tank 114 to circulate the coolant 120 to promote convective heat transfer between the evaporator coil 112 and the glycol 120.

The ff refrigeration unit 110 thermally communicates with the flash freezer 34 for example through a flash freezer coolant line 130 ("ff coolant line 130") having an inlet 132 for receiving glycol 120 from the ff glycol tank 114, an outlet 134 for returning the glycol 120 to the ff glycol tank 114. A pump 136 may be provided to cause flow of the glycol 120 along the ff coolant line 130.

Alternatively a single refrigeration unit may be provided and set at a temperature suitable for cooling glycol for the flash freeze. In this case the glycol could be circulated either directly to the glycol tank 56 or indirectly through the heat transfer coil 68.

As illustrated in FIG. 1, the flash freezer 34 may be in the form of a non-reactive metal probe (e.g. stainless steel) through which cold glycol 120 is passed by virtue of fluid communication with the ff coolant line 130. The probe may be mounted so as to initially be pushed out of the way by the vessel 40. The probe may be configured to initiate flow along the ff coolant line 130 in response to this motion. For example, the probe 34 may be connected to a switch 140 which activates the pump 136. Once the pour has been initiated the vessel 40 may be lowered out of contact with the probe 34 to allow the probe 34 to move back through a stream 42 of the beverage 14 being dispensed from the tap 24.

A biasing mechanism 144 such as a spring or the like may be coupled to the probe 34 to effect its movement back through the stream 40 of beverage 14.

The above is but one possible arrangement for contacting a freezing surface 36 with the beverage 14. Other arrangements will occur to one skilled in such apparatus. For example the freezing surface 36 may be integral with or attached to the tap 24. The balance of the tap is preferably of relatively low thermal conductivity so as to avoid ice formation or its inadvertent acting as a flash freezing surface. Alternatively the vessel 40 may be provided with a freezing surface 36 as illustrated in FIG. 2 and described below.

The vessel 40 has a base 42 and an upstanding sidewall portion 44 which defines a mouth 46 opposite the base 42. A heat sink 48 extends through and sealingly engages the base 40. The heat sink 48 has an inner flash freezing surface 36 adjacent an inner face 41 of the vessel 40. The heat sink 48 has an outer cooling [surfaced] *surface* 49 opposite the flash freezing surface 36 and adjacent an outer face 43 of the vessel 40.

Figure 2:
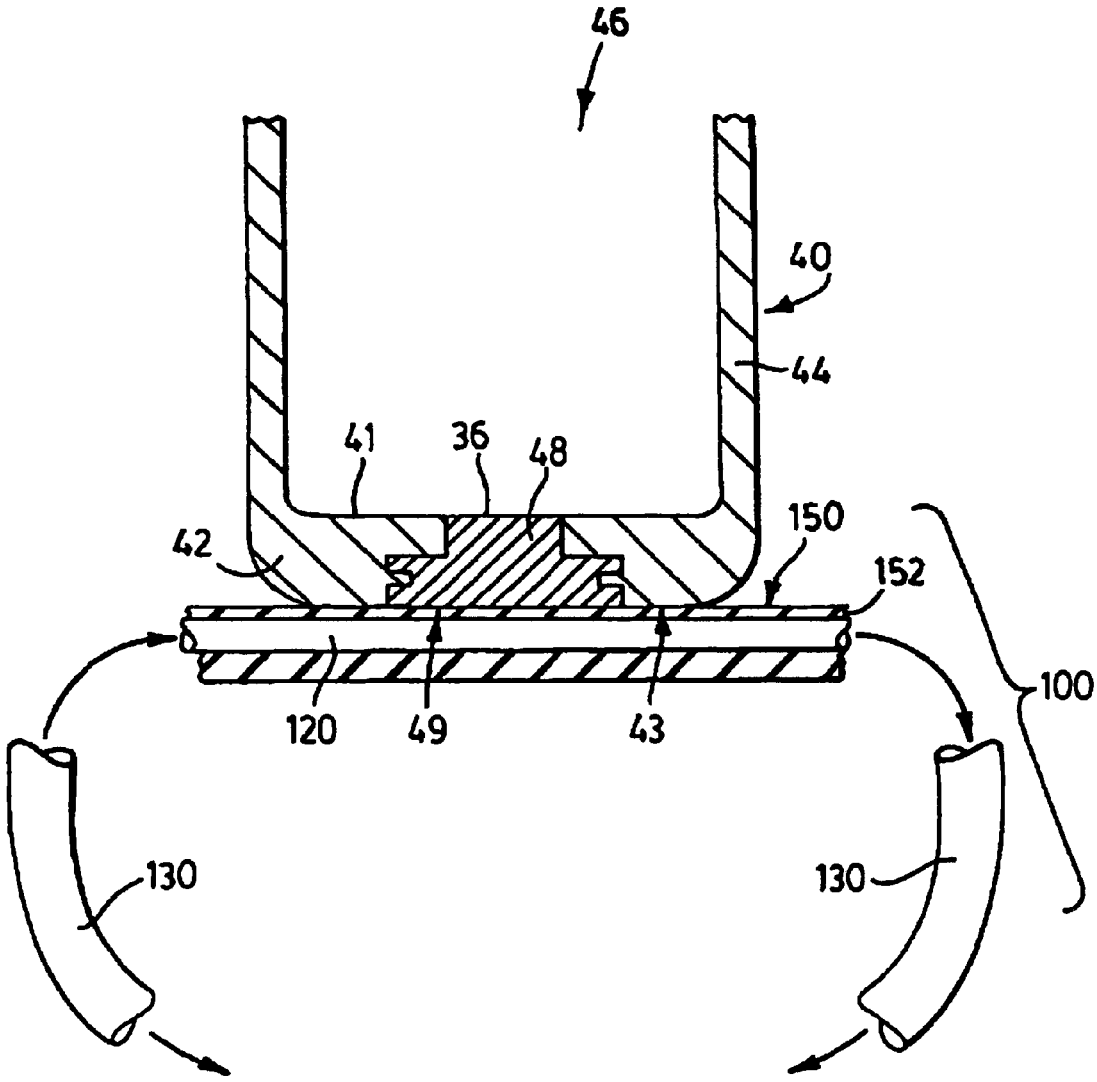

In the FIG. 2 embodiment the flash freezer cooler 100 may be a cold surface 150 for contacting the cooling surface 49 to draw heat out of the heat sink 48. The flash freezer cooler 100 may be a thermally conductive plate 152 which is cooled by cold glycol 120 provided by the flash freezer coolant line 130.

While for simplicity it is expected that the heat sink will be in the base 42 of the vessel, this is not an absolute requirement. For example, the heat sink could be a sleeve forming part of the sidewall portion 44 or may even form the entire base 42 and threadedly engage the sidewall portion 44. Furthermore it may be desirable for sanitary reasons to have the flash freezing surface 36 adjacent to but covered by the inner face 41 rather than extending completely therethrough to avoid ingress of the beverage 14 therebetween. Also it may be desirable for the flash freezing surface continuous with rather than extending into the vessel 40.

It is expected that the heat sink 48 will be a relatively good thermal conductor such as aluminum or cooper based alloys to promote rapid cooling of the freezing surface 36, however stainless steel or other suitable material might also be used. The balance of the vessel will typically be of glass or plastic or ceramics as is commonly known for beverage vessels. Preferably the balance of the vessel will have at least some insulative properties so as to longer retain frozen any ice formed.

Theoretical analysis confirmed by empirical means shows that the temperatures and pressures needed to bring the beverages to the required state where freezing of some of the beverage into ice crystal forms was possible through the methods of this patent varied depending upon the chemical composition of the beverage. For instance, the optimum temperature range for ice formation in two beers having the same alcohol content, but different solute content, shifted by more than 1° F. A beer with an alcohol content of 5% by volume and under a high pressure froze at a temperature four degrees lower than a beer with an alcohol content of 4% by volume and under the same pressure. Pressure requirement also shifted depending upon variables such as $CO_2$ content and alcohol content. Accordingly, where beer is the beverage being presented with ice crystals in it according to the method and apparatus of the present invention, the temperature range is expected to vary from about 23.0° F. to approaching 32° F. (−5° C. to 0° C.). This is largely determined by the alcohol content. For a "5%" beer suitable results would be expected in a preferred range of about 24.0° F. to 27.0° F. (−4.4° C. to −2.7° C.). For higher alcohol beers (above 5%) or lower alcohol beers (4%, 3%) or even "non-alcoholic" (less than 0.5%) beers deviations toward opposite ends of the broader ranges above apply. Likely some "fine turning" will be required to suit particular brands eve within a given alcohol content.

It is believed that the underlying mechanism is one of a solute being driven out of an aqueous solution in a local region adjacent the flash freezing surface by the flash-freezing temperature of the surface. More particularly, when a solute is dissolved in water (for example alcohol or an edible salt), the freezing point of the system is depressed. Presenting a localized heat drain (the flash freezing surface) causes the affected solution to dispel the solute with the resulting water freezing into ice crystals which then remain present in the now more concentrated solution. The foregoing theorem is however being proffered as a possible explanation is [is] not intended in a limiting or binding sense.

The above description is intended in an illustrative rather than a restrictive sense. Variations may be apparent to those skilled in the art without departing from the spirit and scope of the invention as defined by the claims set out below. For example if the flash freezing surface is cold enough it may be possible to achieve the desired result without the pressurization and cooling of the beverage below its atmospheric freezing point. There are limits to how warm one might want the beverage as having it warm will likely result in rapid melting of any ice crystals so formed.

The entire disclosure of Canadian Patent Application No. 2,448,893 filed Nov. 12, 2003 is hereby incorporated by reference.

What is claimed is:

1. A method for producing a desired amount of ice crystal formation in a beverage comprising the steps of:

(i) cooling said beverage to a temperature near or below its ordinary freezing temperature at atmospheric pressure to form a cooled beverage;

(ii) maintaining said beverage at a pressure sufficient to inhibit freezing of said beverage;

(iii) dispensing said cooled beverage into a vessel;

(iv) obtaining a cooled surface, having a temperature sufficiently low to cause flash freezing of a portion of said cooled beverage which comes into contact therewith; and, (v) presenting said cooled surface to said beverage for a time sufficient to form a desired amount of said ice crystals in said beverage.

2. The method of claim 1 wherein:

said temperatures in step (i) is at or below said ordinary freezing temperature; and, upon achieving said desired amount of ice crystal formation said cooled surface is at least one of removed from contact with said beverage and allowed to warm to a temperature above which ice crystal formation ceases.

3. The method of claim 2 wherein:

said beverage is beer;

said temperature in step (i) is from 23.0° F. to approaching 32° F. (−5° C. to 0° C.) as determined by the alcohol content of the beer 28.4° F.; and, said pressure is from 15 psi to 110 psi.

4. The method of claim 3 wherein:

said beverage is dispensed through a dispensing tap; and, said pressure is reduced immediately upstream of said dispensing tap during said dispensing [tap] to avoid splashing and freezing upstream of said tap.

5. The method of claim 4 wherein:

said beverage is a 5% beer;

said temperature in step (i) is from 24.0° F. to 27.0° F. (−4.4° to −2.7° C.); and, said pressure is at least 60 psi (4.13 bar).

6. A beverage dispensing apparatus for chilling and presenting a vessel of said beverage with a portion of said beverage being in the form of ice crystals, said apparatus comprising:

a beverage inlet for receiving said beverage from a reservoir of said beverage;

a valved tap for dispensing said beverage into said vessel;

a beverage conduit extending between said tap and said beverage inlet for providing fluid communication between said tap and said beverage inlet;

a beverage pressurizer communicating with said conduit for increasing the pressure of said beverage to an elevated pressure sufficient to avoid freezing;

a beverage cooler associated with said beverage conduit for chilling at least said beverage within said conduit to a temperature below its freezing point at atmospheric pressure but above its freezing point at said elevated pressure;

a pressure reducer adjacent said tap for reducing the pressure of said beverage from said elevated pressure in said conduit to a pouring pressure to facilitate pouring from said tap when said tap is in an open configuration;

a flash freezer having a freezing surface for contacting said beverage during a pour of said beverage into said vessel to freeze a portion of said beverage to form said ice crystals during said pour;

a flash freezer cooler associated with said flash freezer for chilling said freezing surface to a temperature sufficiently [lower] *low* to form said ice crystals upon contact.

7. The beverage dispensing apparatus as claimed in claim 6 wherein said beverage cooler includes:

a length of said conduit;

a coolant bath surrounding said length of said conduit for receiving a chilled coolant to immerse said length;

a beverage coolant refrigeration unit communicating with said coolant in said bath for chilling said coolant; and, wherein said tap is of a low thermal conductivity material at least in portions thereof in contact with said beverage.

8. The beverage dispensing apparatus as claimed in claim 6 wherein said flash freezer cooler includes a flash freezer refrigeration unit for communicating with said freezing surface for cooling said freezing surface.

9. The beverage dispensing apparatus as claimed in claim 8 wherein said beverage coolant refrigeration unit and said flash freezer refrigeration unit are discrete units.

10. The beverage dispensing apparatus as claimed in claim 9 wherein said length of said conduit immersed in said coolant bath is in the form of a coil.

11. The beverage dispensing apparatus as claimed in claim 10 wherein said pressure reducer is a flow restrictor upstream of said tap.

12. The beverage dispensing apparatus as claimed in claim 11 further including:

a heater for heating said coolant in said bath should said coolant fall below a predetermined temperature;

a sensor for sensing at least one of coolant temperature and beer temperature;

a controller communicating with said heater and said sensor for actuating and deactuating said heater and for respectively deactuating and actuating a pump which provides coolant flow between said coolant bath and said beverage coolant refrigeration unit.

13. The beverage dispensing apparatus as claimed in claim 12 wherein said controller further communicates with and is configured to deactuate and actuate said beverage refrigeration unit while respectively actuating and deactuating said heater.

14. The beverage dispensing apparatus as claimed in claim 13 wherein said flash freezer is a cooled probe which is passed through said beverage during said pour.

15. The beverage dispensing apparatus as claimed in claim 13 wherein said flash freezer is a surface in said vessel and said flash freezer cooler is a cold surface in contact with said vessel at least before said pour.

16. The beverage dispensing apparatus of claim 13 wherein said flash freezer is associated with said tap.

17. The beverage dispensing apparatus of claim 14 wherein said flow restrictor is at least one of a valve, an orifice and a reduced diameter length of said conduit.

18. The beverage dispensing apparatus of claim 15 wherein said flow restrictor is at least one of a valve, an orifice and a reduced diameter length of said conduit.

19. The beverage dispensing apparatus of claim 16 wherein said flow restrictor is at least one of a valve, an orifice and a reduced diameter length of said conduit.

20. The beverage dispensing apparatus as claimed in claim 12 wherein a coolant jacket is provided around said conduit adjacent said tap for circulation of said coolant about said conduit between said bath and said tap.

21. The beverage dispensing apparatus as claimed in claim 13 wherein an inlet to coolant jacket fluidly communicates with said coolant bath through a coolant jacket pump connected between said coolant bath and said coolant jacket and an outlet of said coolant jacket fluidly communicates directly with said coolant bath to act as a fluid return from said coolant jacket to said coolant bath.

*22. A method for producing a chilled beverage suitable for conversion into a beverage having a desired amount of ice crystals, said method comprising the steps of:*

*(i) cooling said beverage to a temperature near or below its ordinary freezing temperature at atmospheric pressure to form a cooled beverage;*

(ii) *maintaining said cooled beverage at a temperature near or below its ordinary freezing temperature at atmospheric pressure while applying pressure sufficient to inhibit freezing of said cooled beverage in a dispensing apparatus; and*

(iii) *dispensing said cooled beverage from said dispensing apparatus into a vessel.*

*23. A method according to claim 22 including the further step of:*

(iv) *acting upon said cooled beverage to cause a desired amount of ice crystals to form therein.*

*24. A beverage dispensing apparatus for chilling and dispensing a beverage into a vessel, said apparatus comprising:*

*a beverage inlet for receiving said beverage from a reservoir of said beverage;*

*a valved tap for dispensing said beverage into said vessel;*

*a beverage conduit extending between said tap and said beverage inlet for providing fluid communication between said tap and said beverage inlet;*

*a beverage pressurizer communicating with said conduit for increasing the pressure of said beverage to an elevated pressure sufficient to avoid freezing;*

*a beverage cooler associated with said beverage conduit for chilling at least said beverage within said conduit to a temperature below its freezing point at atmospheric pressure but above its freezing point at said elevated pressure; and*

*a pressure reducer adjacent said tap for reducing the pressure of said beverage from said elevated pressure in said conduit to a pouring pressure to facilitate pouring from said tap when said tap is in an open configuration.*

*25. Apparatus for chilling a beverage so that ice crystals can be formed in the beverage when it is dispensed, said apparatus comprising:*

*a cooler for cooling the beverage to a temperature near or below its ordinary freezing temperature at atmospheric pressure;*

*a pressurizer for applying additional pressure to the beverage while the beverage is maintained by the cooler at a temperature near or below its ordinary freezing temperature at atmospheric pressure; and*

*wherein the pressure applied to the beverage is sufficient to prevent freezing of the cooled beverage.*

* * * * *